(12) United States Patent
Rosebrugh

(10) Patent No.: US 9,714,674 B1
(45) Date of Patent: Jul. 25, 2017

(54) FASTENER DEVICE

(71) Applicant: Robert Rosebrugh, Oxnard, CA (US)

(72) Inventor: Robert Rosebrugh, Oxnard, CA (US)

( * ) Notice: Subject to any disclaimer, the term of this patent is extended or adjusted under 35 U.S.C. 154(b) by 195 days.

(21) Appl. No.: 14/720,266

(22) Filed: May 22, 2015

Related U.S. Application Data

(60) Provisional application No. 62/156,220, filed on May 2, 2015.

(51) Int. Cl.
F16B 13/00 (2006.01)
F16B 35/00 (2006.01)
F16B 13/08 (2006.01)

(52) U.S. Cl.
CPC .......... F16B 35/00 (2013.01); F16B 13/0875 (2013.01); F16B 13/00 (2013.01)

(58) Field of Classification Search
CPC ... F16B 13/0875; F16B 13/0808; F16B 13/00
USPC .......................................... 411/16, 340, 344
See application file for complete search history.

(56) References Cited

U.S. PATENT DOCUMENTS

| 2,201,930 | A |  | 5/1940 | Stark | |
|---|---|---|---|---|---|
| 2,563,976 | A |  | 8/1951 | Torosian | |
| 2,765,134 | A | * | 10/1956 | Hill | F16B 13/0808 248/489 |
| 3,127,808 | A | * | 4/1964 | Drybread, Sr. | F16B 13/0808 411/346 |
| 3,168,850 | A | * | 2/1965 | Tennican | F16B 13/0808 411/342 |
| 3,892,031 | A |  | 7/1975 | Bisbing | |
| 4,004,486 | A |  | 1/1977 | Schenk | |
| 4,812,097 | A |  | 3/1989 | Moulton | |
| 4,886,405 | A |  | 12/1989 | Blomberg | |
| 5,316,422 | A |  | 5/1994 | Coffman | |
| 6,860,689 | B1 |  | 3/2005 | Attanasio | |
| 8,807,601 | B2 |  | 8/2014 | Anderson | |
| 2009/0103999 | A1 | * | 4/2009 | Fucito | F16B 13/0808 411/342 |
| 2010/0221085 | A1 | * | 9/2010 | Chowdhury | F16B 13/0808 411/33 |

FOREIGN PATENT DOCUMENTS

WO  WO2008/091249  7/2008

* cited by examiner

*Primary Examiner* — Flemming Saether
(74) *Attorney, Agent, or Firm* — Eric Karich; Karich & Associates

(57) ABSTRACT

A fastener adapted to be mounted through an aperture of a wall has an inner stud, a spiral structure, and an outer fastener. The inner stud is sized to fit through the aperture of the wall and hold the spiral structure. The outer fastener engages the inner stud to compress the spiral structure into a washer-like structure, which supports the fastener on the wall.

2 Claims, 7 Drawing Sheets

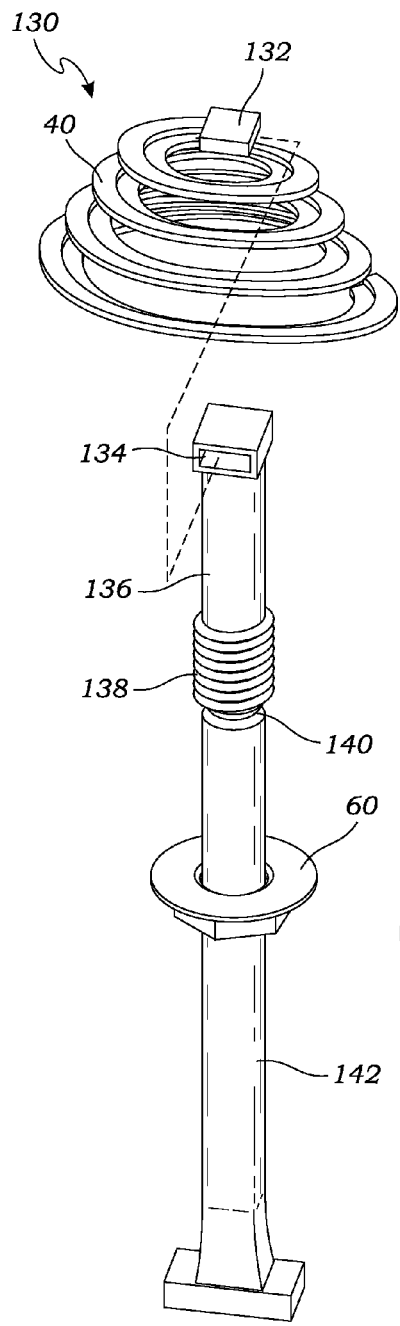
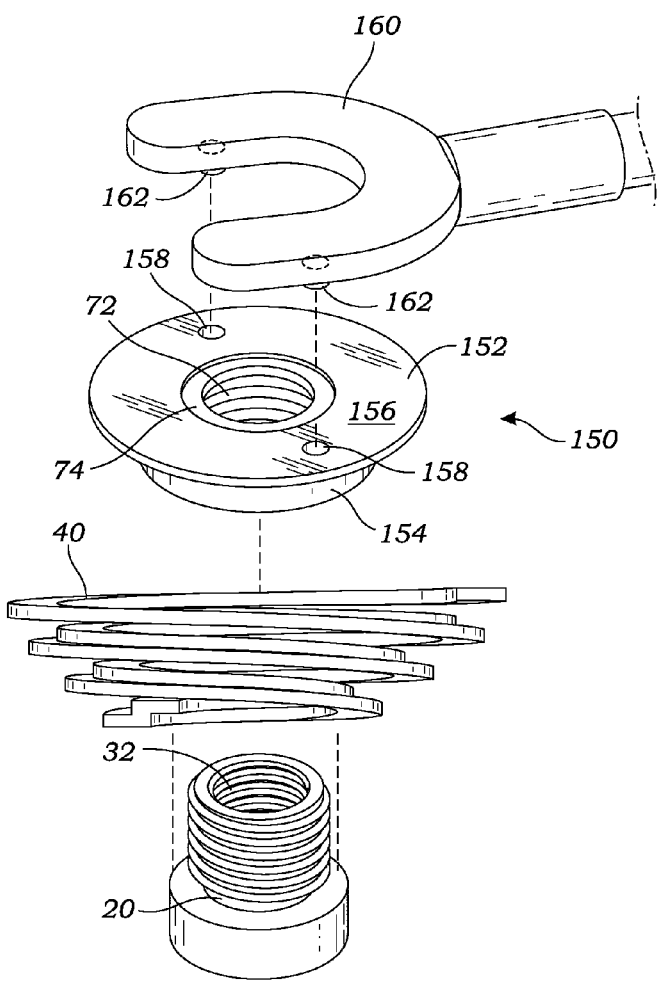
Fig. 8
Fig. 9

FASTENER DEVICE

CROSS-REFERENCE TO RELATED APPLICATIONS

This application for a utility patent claims the benefit of U.S. Provisional Application No. 62/156,220, filed May 2, 2015.

BACKGROUND OF THE INVENTION

Field of the Invention

This invention relates generally to fasteners, and more particularly to a fastener that is adapted for mounting to a wall through an aperture when the space behind the wall cannot be readily accessed.

Description of Related Art

The prior art teaches a variety of fasteners for mounting objects to a wall. There are particular types of fasteners that are adapted for mounting to a wall through an aperture when the space behind the wall cannot be readily accessed.

The prior art teaches a wide variety of toggle bolts, for example, which include a cross-piece that can pivot to a lateral position such that the cross-piece extends across the opening through the wall, to prevent the bolt from being pulled back through the wall.

The prior art devices suffer serious disadvantages. Many prior art fasteners are difficult to install, and provide a weak mount that can be unreliable. Toggle bolts can be difficult to operate, and provide relatively weak and unreliable fastening ability. For example, when a lateral force is applied to a toggle bolt, from a direction traverse the cross-piece, the cross-piece provides very little stability to the bolt.

There is a long-felt need in the art for a fastener device that is strong, reliable, easy to install, and which provides 360 degree support to the bolt of the fastener device.

SUMMARY OF THE INVENTION

The present invention teaches certain benefits in construction and use which give rise to the objectives described below.

The present invention provides a fastener that is adapted to be mounted through an aperture of a wall. The fastener comprises an inner stud sized to fit through the aperture of the wall; a spiral structure having an inner loop that is operably mounted on the inner stud; and an outer fastener that engages the inner stud to compress the spiral structure into a washer-like structure.

A primary objective of the present invention is to provide a fastener having advantages not taught by the prior art.

Another objective is to provide a fastener that may be installed through an aperture in the wall despite not being able to access the back of the wall.

Another objective is to provide a fastener that provides strong support against any direction, 360 degrees, of lateral forces acting upon the fastener.

Another objective is to provide a fastener that provides strong support without damaging the wall.

A further objective is to provide a fastener that is quick and easy to install, yet provides superior strength.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 8 is an exploded perspective view of another embodiment of the fastener;

FIG. 9 is a perspective view of another embodiment of the outer nut of FIG. 1, wherein the outer nut includes a low-profile top flange that includes at least one interlocking feature that is adapted to be tightened with a wrench adapted to engage the interlocking feature.

DETAILED DESCRIPTION OF THE INVENTION

The above-described drawing figures illustrate the invention, a fastener 10 that is adapted to be installed on a wall 12 through an aperture 14 in the wall 12. This is particularly useful in situations wherein the back side of the wall 12 cannot readily be accessed, and the installation must be made entirely through the aperture 14 of the wall 12. For purposes of this application, the term "wall" is defined to include any surface to which an attachment is desired, such as a wall in a structure (i.e., to drywall of the structure), a vehicle having a wall that forms a body of the vehicle (e.g., truck, automobile, boat, aircraft, etc.), or any other similar structure. It is particularly useful in situations where the back of the wall 12 cannot be accessed, or is difficult to access, but it may be used in other circumstances too.

Figure 1:
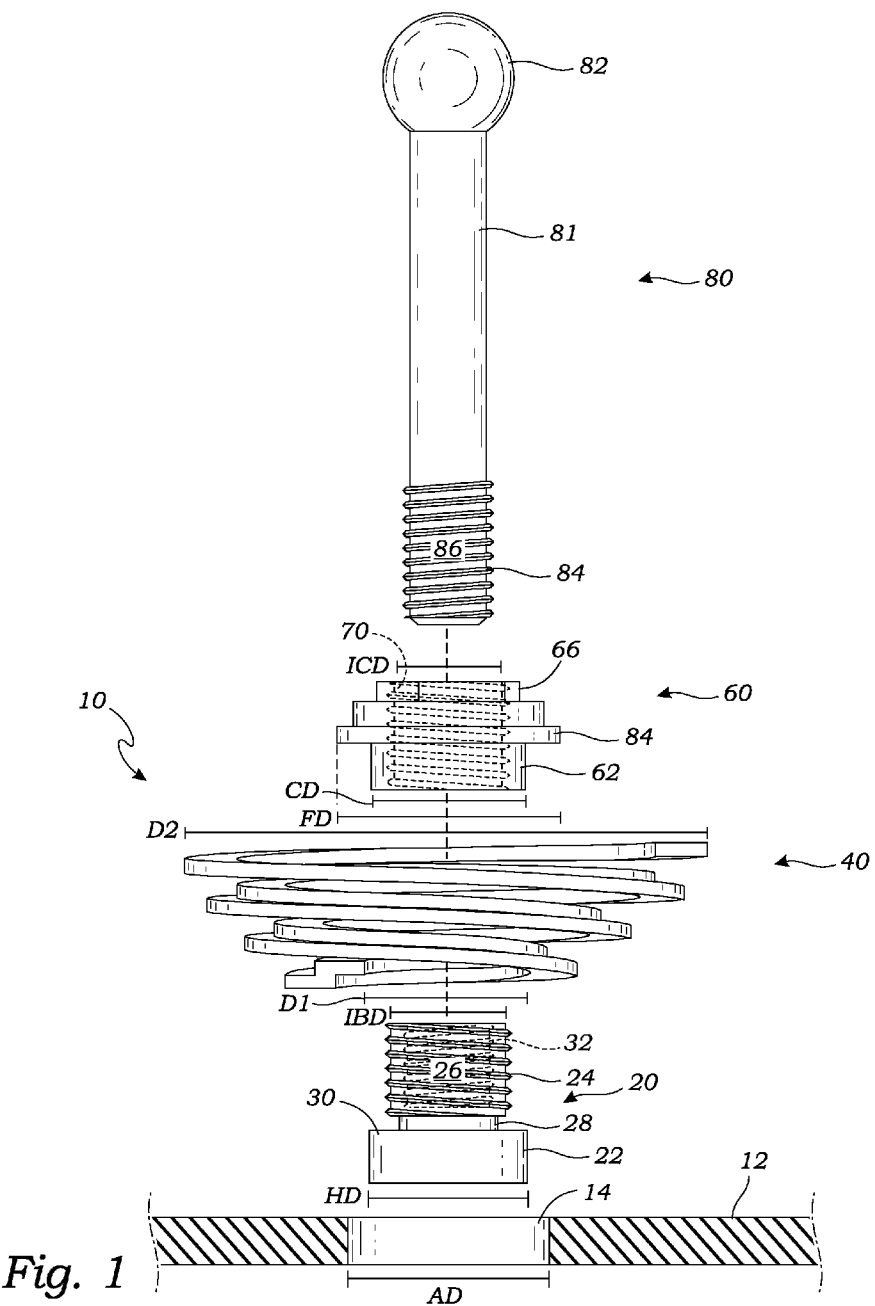
FIG. 1 is an exploded front elevational view of a fastener according to one embodiment of the present invention, illustrating an inner bolt, a spiral ribbon, and an outer nut of the fastener, and further illustrating an installation tool that is used for installation of the fastener through an aperture of a wall.

FIG. 1 is an exploded front elevational view of the fastener 10 according to one embodiment of the present invention. As shown in FIG. 1, the fastener 10 includes an inner stud 20, a spiral structure 40, and an outer fastener 60. The inner stud 20 and the spiral structure 40 are shaped and sized to be inserted through the aperture 14 in the wall 12, while the outer fastener 60 remains outside the wall 12. Once the inner stud 20 and the spiral structure 40 are inserted through the aperture 14, the outer fastener 60 and the inner stud 20 are connected together to compress the spiral structure 40 such that the spiral structure 40 forms a support structure behind the wall 12, such that the support structure of the spiral element and the outer fastener 60 together clamp the wall 12 therebetween so that the fastener 10 is securely mounted on the wall 12.

In the embodiment of FIG. 1, the inner stud 20 is in the form of an inner bolt that includes a head 22 and a shank 24 that extends from the head 22. The shank 24 includes an external surface 26 that may be threaded. A neck 28 may be formed to separate the head 22 from the shank 24, such that a shoulder 30 of the head 22 extends outwardly from the neck 28 of the shank 24. An inner bore 32 in the shank 24 has an inner surface 34 (shown in FIG. 3) that may be threaded. The head 22 has a head diameter HD that is smaller than an aperture 14 diameter AD of the aperture 14, such that the inner bolt 20 is small enough to fit through the aperture 14 in the wall 12. The head diameter HD may be larger in diameter than the shank 24, which in turn may be larger in diameter than the neck 28 of the shank 24. In alternative embodiments, these diameters may differ, as long as each is small enough to fit through the aperture 14 of the wall 12.

As shown in FIG. 1, the spiral structure 40 of this embodiment is in the form of a spiral ribbon that includes a smaller inner diameter D1 that is sized to fit on or adjacent the inner bolt 20, typically on the neck 28 of the shank 24, although this may vary if desired. A larger outer diameter D2 of the spiral ribbon 40 is larger than the aperture diameter AD, so that the spiral ribbon 40 cannot be pulled through the aperture 14 of the wall 12 once the spiral ribbon 40 has been compressed between the inner bolt 20 and the outer nut 60. Typically, the spiral ribbon 40 includes multiple loops which interlock when compressed.

As shown in FIG. 1, the outer fastener 60 of this embodiment may be in the form of an outer nut that includes a main body 62 and a flange 64 that extends radially from the main body 62. While the main body 62 may have a collar diameter CD that is slightly smaller than the aperture diameter AD, so that this portion of the outer nut 60 may fit securely inside the aperture 14 of the wall 12, the flange 64 has a flange diameter FD that is larger than the aperture diameter AD so that this cannot fit through the aperture 14 of the wall 12. A wrench engaging portion 66 is formed in at least part of outer surface of the outer nut 60 (e.g., with a hex nut outer surface, or other suitable shape for use with other forms of wrenches) so that the outer nut 60 may be readily engaged with a wrench 68 (as shown in FIG. 2) or similar tool for tightening the outer nut 60 with respect to the inner bolt 20.

As shown in FIG. 1, the outer nut 60 includes an inner conduit 70 that has an internal surface 72 (shown in FIG. 2) that may be threaded. The inner conduit 70 has an inner conduit diameter ICD that is slightly larger than the shank 24 diameter SD of the shank 24 of the inner bolt 20, so that the outer nut 60 may threadedly engage the shank 24.

Also as shown in FIG. 1, the fastener 10 may be installed using an installation tool 80 that includes an elongate body 81 that includes a proximal end 82 and a distal end 84. The distal end 84 may have an external surface 86 that may be externally threaded. The distal end 84 of the tool body has a tool diameter TD that is slightly smaller than the inner bore diameter IBD of the inner bolt 20, so that the installation tool 80 may be threadedly engaged with the inner bore 32 of the inner bolt 20, to removably mount the inner bolt 20 on the installation tool 80. The tool diameter TD is smaller than the inner conduit diameter ICD of the outer nut 60, so that the installation tool 80 may move easily through the outer nut 60 and the spiral ribbon 40.

Figure 2:
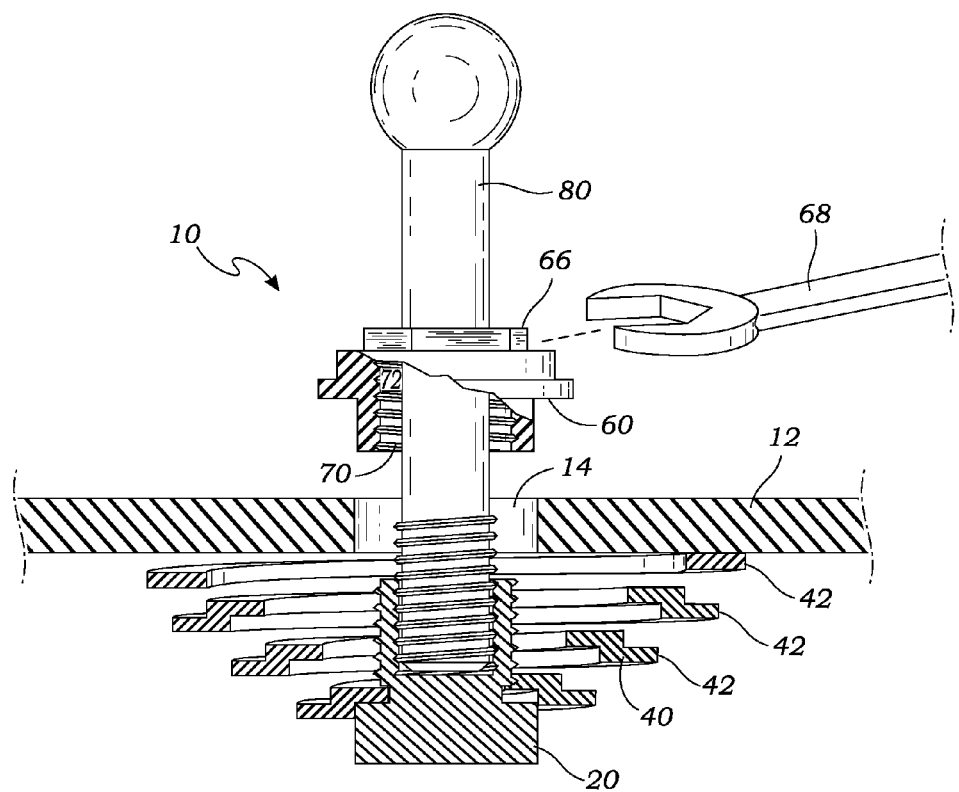
FIG. 2 is a front elevational cross-sectional view of the fastener operably mounted on the installation tool, illustrating how the installation tool is used to position the inner bolt and the spiral ribbon through the aperture in the wall, so that the outer nut can then be threadedly engaged with the inner bolt.

FIG. 2 is a front elevational cross-sectional view of the fastener 10 operably mounted on the installation tool 80, illustrating the installation of the fastener 10 through the aperture 14 in the wall 12. In this embodiment, the spiral ribbon 40 is mounted on neck 28 of inner bolt 20 (e.g., frictionally, with an adhesive, welding, etc.). The installation tool 80 is inserted through the outer nut 60 and the spiral ribbon 40, and the distal end 84 is threadedly engaged with the inner bore 32 of the inner bolt 20. For purposes of this application, the terms "threadedly" and "threaded" are defined to include traditional threads (e.g., as used on standard bolts or screws), and also similar and equivalent structures that enable a similar removably engagement.

As shown in FIG. 2, once the inner bolt 20 is threadedly mounted on installation tool 80, the installation tool 80 may be used to insert the inner bolt 20 through the aperture 14 in the wall 12, and the spiral ribbon 40 may be passed through the aperture 14 by rotating the installation tool 80 and the spiral ribbon 40. From this position, the outer fastener 60 may then be threadedly engaged with the shank 24 of the inner bolt 20. A wrench or similar tool may be used to tighten the outer fastener 60 on the inner bolt 20, so that the spiral ribbon 40 is compressed between the two. The installation tool 80 is threaded with threads that are the opposite of the threads of the outer nut 60, so that tightening the outer nut 60 with the wrench does not cause the installation tool 80 to come off of the inner bolt 20, the movement simply drives the installation tool 80 even further onto the inner bolt 20.

Figure 3:
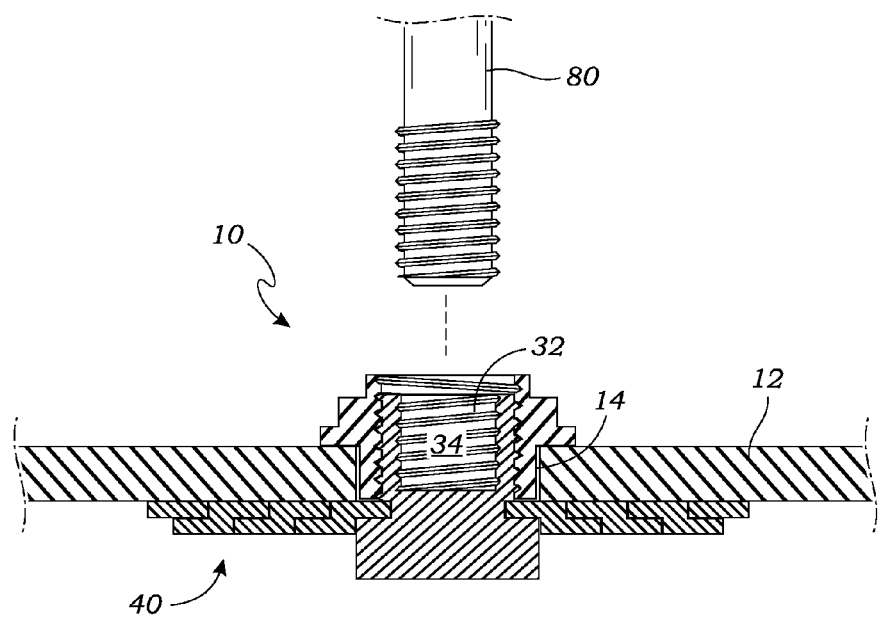
FIG. 3 is a front elevational cross-sectional view of the fastener once it has been installed through the aperture in the wall, illustrating how the outer nut may be tightened onto the inner bolt to compress the spiral ribbon therebetween.

FIG. 3 is a front elevational cross-sectional view of the fastener 10 once it has been installed through the aperture 14 in the wall 12. As illustrated in FIG. 3, once the outer nut 60 has been tightened down on the inner bolt 20, the spiral ribbon 40 is compressed into a washer-like structure that abuts the wall 12. Once the outer nut 60 has been fully tightened, the installation tool 80 may be removed, leaving the fastener 10 fully installed on the wall 12.

Figure 4:
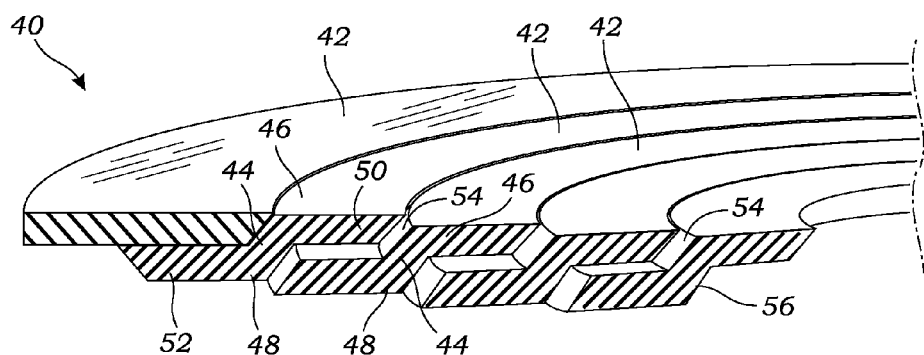
FIG. 4 is a cross-sectional view of one side of the spiral ribbon of the fastener of FIG. 3, illustrating how each loop of the spiral ribbon interlocks with adjacent loops.

FIG. 4 is a cross-sectional view of one side of the spiral ribbon 40 of the fastener 10, illustrating how each loop 42 of the spiral ribbon 40 interlocks with adjacent loops. In the embodiment of FIG. 4, the spiral ribbon 40 has a cross-section that includes a middle portion 44 that includes a top end 46 and a bottom end 48, a top flange 50 that extends inwardly from the top end 46, and a bottom flange 52 that extends outwardly from the bottom end (or the inverse of this structure), forming a generally Z-shaped structure. The middle portion opposite the top inner flange 50 forms a top shoulder 54, and the middle portion opposite the bottom outer flange 52 forms a bottom shoulder 56.

In the embodiment of FIG. 3, the shoulders 30 are orthogonal to the top and bottom flanges 50 and 52. In the embodiment of FIG. 4, the top and bottom shoulders 54 and 56 are not orthogonal, but are angled with respect to the plane of the top and bottom flanges 50 and 52, preferably about 45 degrees ("about" being defined to mean+/−10%), in other embodiments at other angles between 10-80 degrees.

Figure 5:
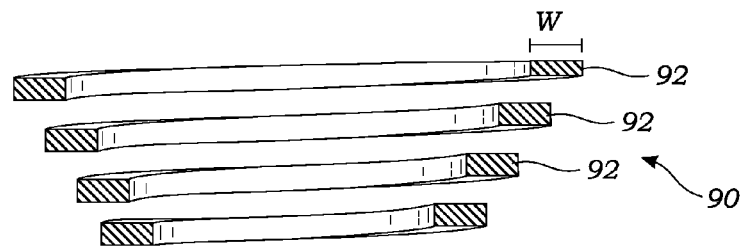
FIG. 5 is a cross-sectional of another embodiment of the spiral ribbon.

FIG. 5 is a cross-sectional of another embodiment of the spiral ribbon 90. In this embodiment, the spiral ribbon 90 is a single ribbon that is flat, and stacks upon itself to form a generally conical structure similar to the prior art devices noted above. Each loop 92 of the ribbon has a width that is great enough so that each of the loops overlaps each of the adjoining loops.

Figure 6:
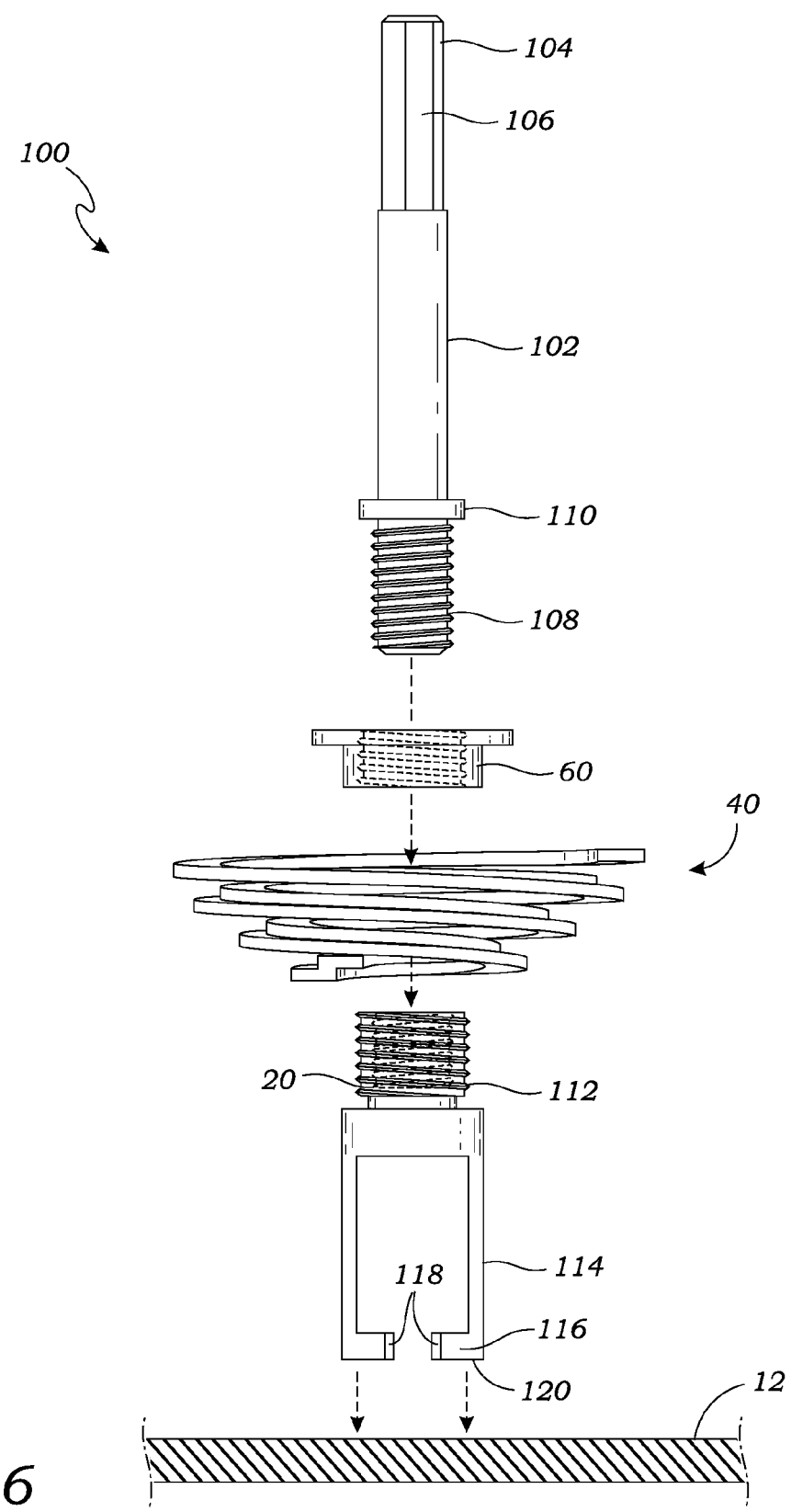
FIG. 6 is an exploded side elevational view of another embodiment of the fastener, wherein the installation tool is in the form of a drill bit, and wherein the inner bolt includes a drywall hole cutter device.

FIG. 6 is an exploded side elevational view of another embodiment of the fastener 100, wherein the inner stud 20 includes a drywall hole cutter device 112. In the embodiment of FIG. 6, the fastener 100 is adapted to be installed in drywall, and can cut the aperture in the wall 12 as part of the installation process. The installation tool 102 in this embodiment may be in the form of a drill bit which includes a proximal end 104 with a drill attachment portion 106 that is adapted for attached to a drill, and a threaded distal end 108 for attachment to the inner stud 20, as described below. In this embodiment, the installation tool 102 further includes a collar stop 110 adjacent the threaded distal end 108 to limit the extend that the installation tool 102 may penetrate into the inner stud 20.

In this embodiment, the inner stud 20 includes the drywall hole cutter device 112, which in this case includes extension arms 114 that extend downwardly from the inner stud 20, to a generally annular cutter 116 that includes a lower cutting edge 119 and at least one lateral cutter 118.

In operation, a drill (not shown) is operably attached to the drill attachment portion 106, and the installation tool 102 is driven into the inner stud 20 until the threaded distal end 108 is firmly engaged. The drill may then be used to rotate the drywall hole cutter device 112 for cutting through the wall 12. Once the aperture has been cut, the inner stud 20 is pushed through the aperture, and the rotary motion further spins the spiral 40 through the aperture. The outer fastener 60 is then mounted on the inner stud 20 and held with a wrench (as discussed above), and the drill is operated in reverse to tighten the outer fastener 60 onto the inner stud 20, and then ultimately unscrew the installation tool 102 from the inner stud 20, thereby completing installation. While this one method is described in detail, those skilled in the art may devise many alternative methods for installing the fastener 100, consistent with the above-described teachings.

Figure 7:
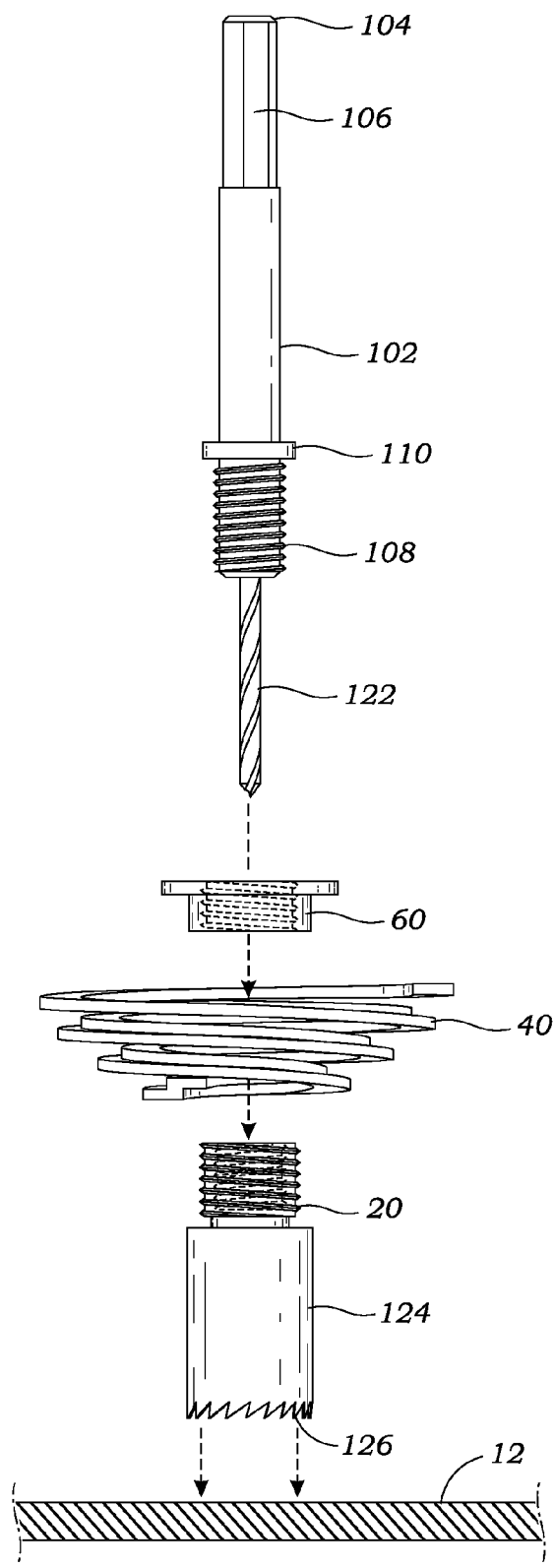
FIG. 7 is an exploded side elevational view of another embodiment of the fastener, wherein the installation tool is in the form of a drill bit that includes a guide bit, and wherein the inner bolt further includes a hole saw bit.

FIG. 7 is an exploded side elevational view of another embodiment of the fastener 120. In this embodiment, the installation tool 102 is in the form of a drill bit, as in FIG. 6, and which further includes a guide bit 122 that extends downwardly from the threaded distal end 108. The inner stud 20 of this embodiment includes a hole saw bit 124 that may include an annular serrated cutting surface 126 for cutting the wall 12. The guide bit 122 engages the wall 12 so that it can hold the fastener 120 stable when the hole saw bit 124 is cutting, so that the installation tool 102 functions as a mandrel, to prevent the hole saw bit 124 from "walking" during the cutting process.

FIG. 8 is an exploded perspective view of another embodiment of the fastener 130, wherein an alternative inner stud includes a mounting structure 132 is integrally formed or attached to an inner end of the spiral structure 40, and the mounting structure 132 is engaged with a second mounting structure 134 of a mounting bolt 136 that includes a threaded portion 138. The mounting bolt 136 is removably attached, via a frangible portion 140, to an elongate installation tool 142, and further includes the outer fastener 60 operably positioned thereupon.

In operation, the elongate installation tool 142 is used to insert the spiral structure 40, by rotating it as described above. Once the spiral structure 40 is through, the elongate installation tool 142 is pulled back to compress the spiral structure 40, and the outer fastener 60 is screwed onto the threaded portion 138. Once the outer fastener 60 has been tightened, the elongate installation tool 142 may be removed by breaking away the frangible portion 140.

FIG. 9 is a perspective view of another embodiment of the outer nut 150. In this embodiment, the outer nut 50 includes a low-profile top flange 152 and a tubular inner portion 154 opposite a top surface 156 of the top flange 152. At least one interlocking feature 158, in this case a pair of bores, are positioned on the top surface 156 and are adapted to be tightened with a wrench 160 adapted to engage the interlocking feature 158. In this case, the wrench 160 includes a pair of posts 162 that are shaped and positioned to engage the interlocking features 158 for tightening the outer nut 150.

Figure 10:
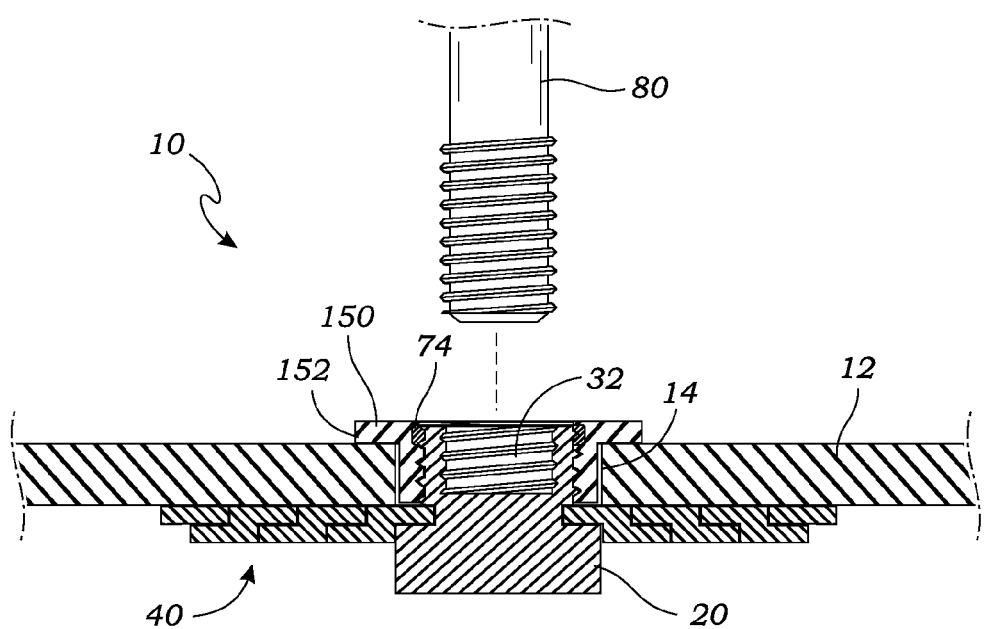
FIG. 10 is a side elevational sectional view of the fastener of FIG. 9 following installation, illustrating the low profile of the outer nut once the fastener is mounted on the wall.

In the embodiment of FIG. 9, the outer nut 150 further includes an annular locking ring 74 disposed on at least part of the inner conduit 72. The annular locking ring 74 may be constructed of nylon, and is adapted to further lock the outer nut 150 in place once installed. FIG. 10 is a side elevational sectional view of the fastener 10 of FIG. 9 following installation, illustrating the low profile of the outer nut 150 once the fastener 10 is mounted on the wall 12. As shown in FIG. 10, the outer nut 150 does not extend outwardly a significant amount to interfere with an installation, and the internal surface 72 is available for mounting other items, either directly or through incorporation of an additional piece of mounting hardware (not shown). The mounting hardware, for example, may threadedly engage the internal surface 72 and extend outwardly for mounting other devices on the wall 12.

As used in this application, the words "a," "an," and "one" are defined to include one or more of the referenced item unless specifically stated otherwise. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

What is claimed is:

1. A fastener for mounting through an aperture of a wall, the aperture having an aperture diameter, the fastener comprising:
   an inner stud sized to fit through the aperture of the wall, the inner stud having a shank with an external surface that is threaded, and further having an inner bore having an inner surface that is threaded;
   an installation tool that includes an elongate body that extends from a proximal end to a distal end, wherein the distal end includes an external surface that is threaded, such that the inner stud may be operably mounted on the installation tool;
   a spiral structure having an inner loop that is operably mounted on the inner stud, and which extends to an outer loop that has a diameter that is larger than the aperture diameter, the spiral structure extending around the installation tool when the inner stud is operably mounted on the installation tool;
   an outer nut having an inner conduit, the outer nut having an inner conduit that is larger than a diameter of the installation tool such that the outer nut may be operably mounted on the installation tool above the spiral structure, wherein the outer nut may be threadedly engaged with the inner stud to compress the spiral structure into a washer-like structure; and
   wherein the external threads of the installation tool spiral in a direction that is opposite of the threads of the external surface of the shank of the inner stud.

2. The fastener of claim 1, wherein the inner stud further comprises a neck formed between a head and the shank, the neck having a smaller diameter than the head and the shank.

* * * * *